Figure 1:
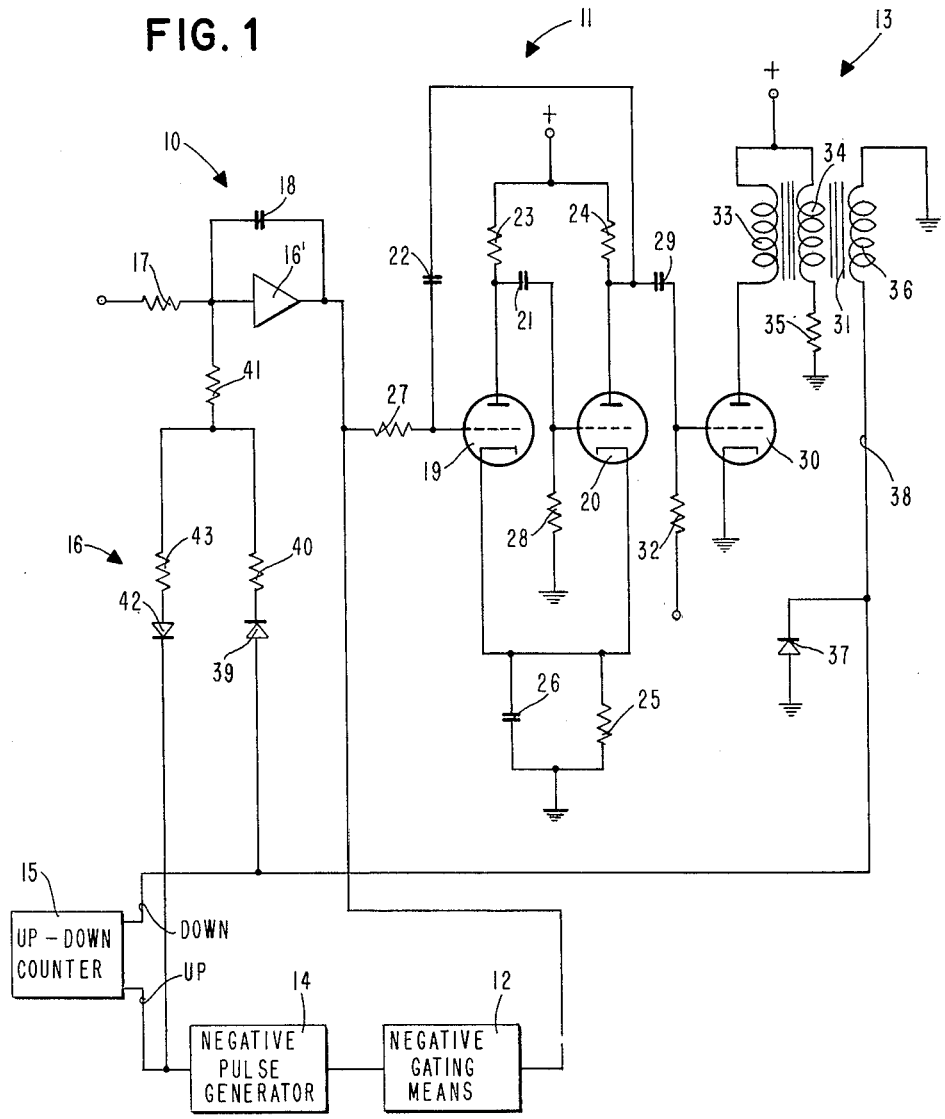

INVENTOR
JOHN R. QUICK
BY George J. Netter
ATTORNEY

June 8, 1965  J. R. QUICK, SR  3,188,455
INTEGRATING MEANS
Filed Dec. 29, 1960  2 Sheets-Sheet 2

United States Patent Office 3,188,455
Patented June 8, 1965

3,188,455
INTEGRATING MEANS
John R. Quick, Sr., St. Louis, Mo., assignor to International Business Machines Corporation, New York, N.Y., a corporation of New York
Filed Dec. 29, 1960, Ser. No. 79,406
5 Claims. (Cl. 235—183)

The present invention relates generally to integrators and more particularly to an electronic integrator providing a digital result.

Conventional electronic integrators are composed of a standard high quality D.C. amplifier having its output and input coupled together by a capacitance. Such an integrator is a relatively high accuracy device providing under best conditions an output that can be held to considerably less than 1% error. However, in order to obtain this high degree of accuracy, the device must be limited during any single operation to a reasonably short computing time. The main source of error encountered in extended operation of this type of integrator is the decay of the current through the coupling capacitance, which not only itself directly appears at the output as an error, but also can serve to increase errors already present in the input from other causes.

In many operations requiring integration of some function, it is highly desirable that the value so obtained for the integral of the function be in digital form irrespective of the form in which the input function exists. For example, if the velocity of an aircraft during some interval is continuously represented as an analog voltage which on being integrated corresponds to the distance covered by the aircraft during the same interval, digital representation of this distance can be either conveniently and easily stored for later use or immediately utilized by other equipment for the determination of other information of which the computed distance is one factor.

It is, therefore, a primary object of the invention to provide an electronic integrator capable of providing a high accuracy digital output for relatively long computing times.

Another object of the invention is the provision of an integrating means for obtaining a digital value in a counter which is in direct correspondence to the time integral of the input function to the integrating means.

Still another object of the invention is to provide an integrator having positive and negative digital outputs corresponding, respectively, to positive and negative electrical inputs permitting algebraic summation of the digital output.

Briefly, the above objects of the invention are accomplished by the provision of an electronic D.C. analog type integrator composed of a D.C. operational amplifier having a capacitance connecting the output and input of the amplifier together to serve as a feedback network. The electrical input signal to this amplifier has a magnitude proportional to the rate of change of some variable with respect to time, i.e., the voltage is a function of the variable with respect to time. The output of the amplifier is fed into a special gating means of such a nature that it will only provide a signal output for those outputs of the operational amplifier having magnitudes exceeding a certain predetermined threshold value. A pulse generating means actuated by the gating signal provides a special electrical counting pulse which is fed simultaneously into an updown counter and into the input of the D.C. amplifier in such polarity as to reduce the output signal substantially to zero. The counter sums up the pulses generated by the pulse generator providing the desired digital representation of the integral of the input function.

The foregoing and other objects, features and advantages of the invention will be apparent from the following more particular description of a preferred embodiment of the invention, as illustrated in the accompanying drawings.

Figure 2:
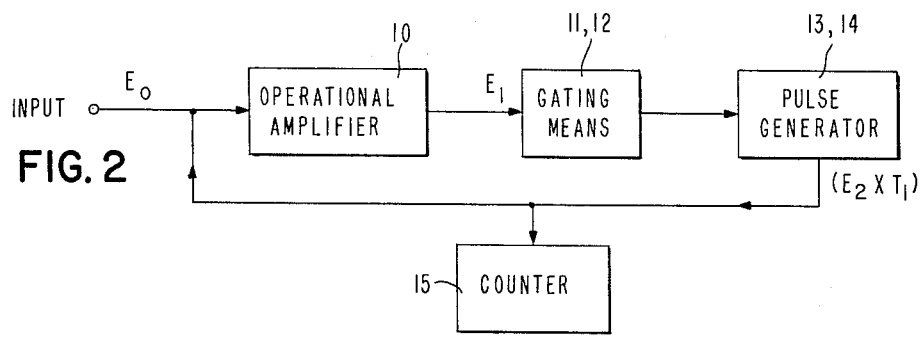
Figure 3:
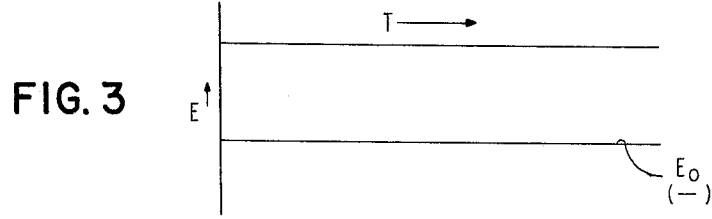
Figure 4:
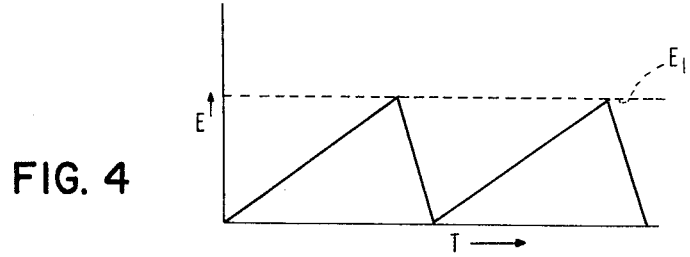
Figure 5:
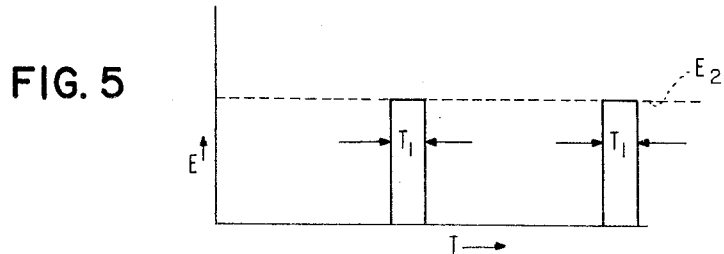

In the drawings:
FIG. 1 is a schematic diagram of the novel integrating means of the invention;
FIG. 2 is a functional block diagram of the integrator of FIG. 1; and
FIGS. 3 through 5 are graphs illustrating the time sequence of operation of the different parts of the novel integrator set forth herein.

With reference now particularly to FIG. 1, there is shown in electrical schematic form a preferred embodiment of the invention which is seen to comprise in its broadest aspects an integrating operational amplifier 10, a positive gating means 11, a negative gating means 12, positive and negative pulse generators 13 and 14, respectively, an up-down counter 15 and a feedback isolation means 16. However, before entering into a detailed analysis of the construction of these basic elements of the invention and the specific way in which they are cooperatively interconnected for accomplishing the purposes and objects of the invention, the broad relationship of the different elements to another will be presented at this time using the functional block diagram illustrated in FIG. 2 as a guide.

It shall be assumed for simplicity sake during the following discussion of the functional relationship of the basic elements of the invention that the input signal to be integrated consists of substantially steady state D.C. voltage having a fixed value $E_0$. This voltage is presented to the input terminals of the operational amplifier which acts upon it to provide an output voltage of a steadily rising (or falling) potential sometimes termed a ramp voltage, any point of which corresponds substantially to the integral of the input voltage over the period of time required for the voltage to change from a zero level to the point in question.

Given a sufficiently large value of input signal, the ramp voltage will after a sufficient time assume a predetermined threshold value $E_1$ which, when presented to the input of the gating means, is just sufficient for actuating the gate to produce a gate output pulse.

The gated pulse is then fed into a pulse generator which in response thereto provides an output pulse of predetermined constant voltage and time characteristics. This particularly defined pulse is then fed into the appropriate input terminal of an up-down counter and simultaneously introduced into the input of the operational amplifier.

The special pulse is thus utilized to achieve a two-fold result: (1) the introduction of a unit count into the counter signifying that a specific amount of integration has been performed which corresponds to the constant area $E_2 \times T_1$ of the pulse as shown in FIG. 5; and (2) the same pulse, by virtue of its magnitude and polarity, when presented to the input of the integrator serves to drive the input voltage substantially to zero. On zero input voltage at the input of the amplifier, the ramp voltage is quickly reduced to zero so that the gating means is placed in a de-energized state and the pulse generator thereby deactivated. However, since this retarding influence on the operation of the pulse generator is only in effect for the time $T_1$, at the end of that time the normal input signal $E_0$ is once again presented to the input of the operational amplifier and operated upon to repeat the above-described cycle. This cyclic production of a ramp voltage and its subsequent reduction to zero is illustrated in FIG. 4, and the associated counting pulses generated, in FIG. 5.

Breaking the total use time of the operational amplifier into short periods almost completely removes errors resulting from the decay factor in the integrating capacitance coupling the amplifier. Also, by confining the amplifier output within specified limits insures the integration is performed in the optimum operating range of the amplifier. In fact, in the practice of the invention, accuracies in the range of 0.01% can reasonably be expected which is considerably better than presently known electromechanical integrators.

Turning now to FIG. 1 and a preferred embodiment of the invention, the operational amplifier 10 is seen to include a conventional D.C. amplifier 16' provided with a series resistance 17 through which input electrical voltage signals to be integrated are fed. A feedback network consisting of a capacitance coupled D.C. amplifier operates as an integrating means in a way well known in the electronic art, and it is sufficient for present purposes to note that the principle of operation depends basically upon the charging and discharging of the capacitance 18.

For a more detailed treatment of the theoretical aspects of such operational amplifiers being used as integrators, reference can be made to pages 22–26 of the book "Pulse and Digital Circuits" by Jacob Millman and Herbert Taub, 1956, published by McGraw-Hill Book Company, Inc.

A highly satisfactory operational amplifier for present purposes can be obtained by capacitance coupling a Model 16-6H D.C. amplifier manufactured by Electronics Associates, Inc.

Since the input voltage signal to be integrated and converted to a digital quantity may have both positive and negative voltage values, a suitable means is provided for accommodating both polarities. Thus, after the input voltage signals have been acted upon by the operational amplifier 10, the integrated signal is then fed simultaneously in two different apparatus, one for acting upon positive integrated signals (illustrated as a circuit of parameters in FIG. 1) and one for solely acting upon negative integrated signals (merely shown in block form in FIG. 1). These two apparatus are substantially the same and operate in an identical manner, except that the one is so biased as to act only on positive signals whereas the other is oppositely biased to act solely upon negative signals. Accordingly, only one will be examined in detail herein, namely, that devoted to operating on negative amplifier input voltages or positive ramp voltages. This difference in polarities between the input and output signals of the amplifier is entirely a result of the type of amplifier chosen and other amplifiers are available which provide a positive ramp output for a positive input and a negative output for a negative input.

The positive gating means 11 comprises a pair of vacuum tubes 19 and 20 so interconnected as to form what is termed a one shot, plate-coupled multivibrator. Capacitance coupling between the control grid of one tube and the plate of the other is provided by capacitances 21 and 22. Plate voltage is supplied from a D.C. positive voltage source (not shown) to the tubes through load resistances 23 and 24, and the cathodes are connected together to ground through a series resistance 25 provided with an RF bypass shunt capacitance 26.

The control grid of tube 19 is provided with a series resistance 27 of such value as to prevent conduction of the tube until the output voltage of the operational amplifier 10 reaches the preselected threshold value $E_1$. Also, tube 20 has a control grid bias resistance 28 connected to ground and of such value that with no signal input the tube 20 is conducting. In other words, in the no signal condition, tube 19 is quiescent and tube 20 is conducting.

The pulse generator 13 receives its input from the plate circuit of tube 20 through a coupling capacitance 29. The generator is composed of a triode driver 30 and a pulse transformer 31. The tube is suitably biased by resistance 32 to cutoff in the no-signal condition and has a grounded cathode.

The pulse transformer is a three-winding transformer having a core of relatively high effective permeability. Two of the windings 33 and 34 are wired in series bucking connection with the common end of the seriesed windings connected to the D.C. plate voltage supply and the two free ends connected to the plate of tube 30 and through a resistance 35 to ground, respectively. The third or output winding 36 has one end placed at ground potential and the other end connected to the appropriate input terminal of the counter.

As to the operation of the pulse generator, with no signal on the control grid of the driving tube 30, it is in a quiescent state being negatively biased through bias resistance 32. Also, at this time, the seriesed winding 34 connected to ground through resistance 35 is drawing sufficient current to saturate the transformer core. On application of an energization signal to the control grid of tube 30, the tube begins to conduct and to draw plate current. The plate current is of sufficient magnitude and direction through the windings 33 and 34 to cause the core of the transformer to be saturated in the opposite direction. The reversal of direction of the current through the winding 34 and establishment of saturation in the opposite direction causes a voltage to be induced in the winding 36 of pulselike duration.

The counting pulses produced by the generator are accurately reproducible each time the tube 30 conducts since it is the transformer characteristics in the main which determine the specifics of the pulses and they are highly stable and little affected by normal environmental changes.

On removal of the energization signal from the control grid of the tube 30 leaving the grid negatively biased and turning the tube off, the field in the series winding 34 of the pulse transformer begins to collapse inducing a second voltage in the output winding 36 of the transformer which is of opposite polarity to the first pulse. This second pulse serves no useful purpose in the operation of the invention and for that reason a means 37, such as a diode, is connected between the third or output winding of the pulse transformer to ground and in such direction electrically as to bleed-off or remove this negative pulse.

Any one of a number of different commercially available counters is suitable for use here. One such is the Model 7370R, Universal Eput and Timer, manufactured by Bechman/Berkley.

Turning now to the detailed operation of the invention, it is assumed that a negative D.C. voltage $E_0$ is present at the input of the operational amplifier 10. Accordingly, the amplifier provides a steadily rising positive voltage at its output. This positive ramp voltage on reaching the magnitude $E_1$ provides a sufficiently great positive bias through resistance 27 to the control grid of the triode 19 to initiate conduction in that tube. Conduction increases the plate current which reduces the plate voltage accordingly. The latter causes the positive bias to be reduced on the control grid of triode 20 sufficiently to shut it off. With triode 20 in a non-conductive state, there is a consequent increase in its plate voltage providing a positive bias through capacitance 22 to the control grid of triode 19 to sustain conduction of triode 19 as long as $E_1$ is also present.

Additionally, this increase in the plate voltage of triode 20 is reflected through coupling capacitance 29 as a positive bias on the tube 30 which initiates conduction in the latter tube causing generation of a pulse in the manner brought out above.

The positive pulse produced by the generator is fed by wire 38 into the appropriate input of a conventional up-down digital counter which here is the negative or down side of the counter to correspond to the polarity of $E_0$.

Simultaneously with the impulsing of the counter, the same pulse is presented to the input of the operational amplifier 10 through a series circuit consisting of an isolating diode 39 and scaling resistances 40 and 41. Since the pulse is opposite in polarity to the input signal $E_0$ now being impressed upon the operational amplifier, this results in a subtraction of the pulse value from the input signal. Also, the magnitude of the pulse and its duration as brought out above are such as to drive the ramp voltage output of the amplifier substantially to zero (0) at the end of the time $T_1$ thereby clearing the amplifier.

As noted above and illustrated in FIG. 1, a separate gating means and pulse generator are provided for handling the negative integration voltages produced by the operational amplifier in response to positive signal inputs $E_0$. As above, the pulse output of the negative pulse generator is fed back to the input of the operational amplifier through a diode 42, a resistance 43 and the resistance 41. The diodes 39, 42 and associated resistances 40, 41 and 43 serve to isolate the respective counting pulse generators from one another.

When the output of the operational amplifier has been cleared, i.e., brought effectively to zero (0), and the feedback pulse is completed, the amplifier once again begins to provide an output integration voltage, or ramp voltage in response to $E_0$ input. This cyclic generation and rapid quenching of the ramp voltage occurs at a rate which is directly dependent on the magnitude of the input signal. More precisely, for such a system as described hereinabove, the pulse rate is directly proportional to the magnitude of the input signal, i.e., the greater the input voltage to the operational amplifier the faster the ramp voltage rise and the faster the pulse rate or count. Therefore, it is to be understood that although for ease of explanation an $E_0$ was chosen constant so as to provide a uniform ramp voltage, this would not be the case when $E_0$ varied. Thus, in the latter case, there would be a consequent variation in the angle of incline (decline) of the ramp voltage.

Having obtained an algebraic summation of positive and negative pulse inputs to the counter, it is seen that an extremely close approximation of the integral of the input voltage $E_0$ over a total sampling time is obtained by merely multiplying the pulse count obtained by the voltage-time area of the counting pulses, i.e., $E_2 \times T_1$.

In only operating the operational amplifier continuously for short periods of time and within a precise output voltage range ($E_1$), the amplifier 16' and its integrating capacitance 18 are, during all such operation periods, functioning at the optimum. Of prime importance is the fact that during short periods of use the decay factor of the integrating capacitance 18 is substantially eliminated as a source of error.

It is worthy to note that a most critical point in the operation of the invention is the requirement that the counting pulse have a substantially constant voltage-time area of ($E_2 \times T_1$). It follows from this that having a good quality pulse generator in the system will permit the utilization of an integrating amplifier of lesser quality thereby resulting in substantial material cost savings because of the wide differential in cost of the two items.

It is also of importance to recognize that since the operational amplifier must provide an output voltage of magnitude $E_1$ before a counting pulse is generated, any drift of the D.C. amplifier 16' will not result in an error in the total digitized integration exceeding one (1) pulse, unless the drift is great enough of itself to provide an output voltage of value $E_1$, which is an extremely remote possibility. Instead, the major effect of any amplifier drift is to change the operating point of the amplifier which is of little effect on the accuracy of the total operation.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for integrating an electrical signal over a relatively long duty cycle and transforming said integral into stored digital form, comprising: an integrating operational amplifier having an input for receiving the electrical signal to be integrated and an output for providing an electrical signal proportional to the time integral of said input signal; gating means connected to the output of said operational amplifier responsive to signals received therefrom having magnitudes in excess of a predetermined threshold value for providing an excitation signal; an electrical pulse generator actuated by said excitation signal for providing output pulses of substantially constant duration and amplitude in response thereto; pulse counting means operably connected to said pulse generator; and means for presenting the pulses as negative feedback to the input of said operational amplifier thereby reducing the input signal to said amplifier.

2. Apparatus for integrating a signal as in claim 1, wherein the pulse generator provides negative feedback pulses of such magnitude and duration that on being fed into the input of the operational amplifier it reduces the output of said amplifier substantially to zero (0.).

3. Apparatus for transforming input analog voltages representing functions of a variable into pulse outputs, the number of such pulses being proportional to the time integral of the variable comprising, in combination: a D.C. amplifier having its output coupled to its input by a capacitance for receiving the analog voltages and providing a ramp voltage output; gating and pulse generating means connected to the output of said D.C. amplifier and responsive to values of said ramp voltage beyond a predetermined voltage range for providing a pulse output of constant voltage-time characteristics; and a feedback circuit connecting the pulse output of said generator to the input of said amplifier to diminish the value of the signal being impressed upon the input of said amplifier for the duration of each pulse thereby establishing the output of said amplifier beyond the values of ramp voltage required for actuating said gating and pulse generating means during the existence of each pulse.

4. In apparatus for providing digital computations of the integral of analog input voltages comprising, in combination: a capacitance coupled D.C. amplifier into which the analog signal voltages are fed for providing at its output a positive ramp voltage for negative input voltages and a negative ramp voltage for positive input voltages, the values of said ramp voltages being the integral of said input voltages; gating means connected to the output of said amplifier for providing a first excitation signal in response to a positive ramp voltage of a first single predetermined magnitude and a second excitation signal in response to a negative ramp voltage of a second predetermined magnitude; pulse generating means connected to said gating means for providing a positive pulse in response to said first excitation voltage and a negative pulse in response to said second excitation voltage, said pulses having substantially identical voltage values and of uniform time duration; counting means actuated by said positive and negative pulses for providing an algebraic sum of said pulses; and means interconnecting the outputs of said pulse generator to the input of said operational amplifier for providing negative feedback to reduce the value of the input voltages to the amplifier whereby a plurality of pulses are generated in a cyclic manner the algebraic sum of which is representative of the integral of the analog voltage input.

5. In a device for providing a digital indication of the integral of an analog electric signal comprised of an electronic integrating amplifier, an amplitude discriminating means fed by the amplifier for providing energization signals in response to selected output signals of said amplifier and a counting pulse generator actuated by said energization signals to provide negative feedback pulses to the input of said amplifier, the generator including means for providing pulses of magnitude and duration relative to the analog voltage signal such that the output of the amplifier is brought substantially to zero by each pulse thereby clearing the amplifier after each integration.

References Cited by the Examiner
UNITED STATES PATENTS

| | | | |
|---|---|---|---|
| 2,891,725 | 6/54 | Blumenthal et al. | 235—183 |
| 2,864,556 | 12/58 | Raymond | 235—183 |
| 2,903,185 | 9/59 | Myers | 235—183 |

MALCOLM A. MORRISON, *Primary Examiner.*

CORNELIUS D. ANGEL, *Examiner.*